United States Patent [19]

Pita et al.

[11] Patent Number: 4,529,369
[45] Date of Patent: Jul. 16, 1985

[54] MOLD APPARATUS FOR SHOES AND THE LIKE

[75] Inventors: Frank J. Pita, Miami Lakes; Noel R. Pineda, Hialeah, both of Fla.

[73] Assignee: Suave Shoe Corporation, Miami Lakes, Fla.

[21] Appl. No.: 585,936

[22] Filed: Mar. 5, 1984

[51] Int. Cl.³ .............................................. A43D 65/00
[52] U.S. Cl. .................................... 425/119; 264/244
[58] Field of Search ...................... 425/119; 264/244; 12/1 W, 4.1, 4.5, 7.3, 8.3, 142 RS

[56] References Cited

U.S. PATENT DOCUMENTS

| | | | |
|---|---|---|---|
| 2,518,336 | 8/1950 | Koch | 12/7.3 |
| 2,945,260 | 7/1960 | Bell | 18/42 |
| 2,972,777 | 2/1961 | Ghignatti | 18/34 |
| 2,994,920 | 8/1961 | Patera | 264/244 |
| 3,014,242 | 12/1961 | Baker et al. | 425/119 |
| 3,302,244 | 2/1967 | Ludwig | 264/244 |
| 3,523,333 | 8/1970 | Taylor et al. | 425/119 |

Primary Examiner—Caleb Weston
Attorney, Agent, or Firm—Shapiro and Shapiro

[57] ABSTRACT

Apparatus for molding the sole of a shoe and the like to an upper comprises a pair of mold elements adapted to come together laterally and having peripheral edge portions for engaging the upper. Corresponding ends of the peripheral edge portions are configured for defining a gap therebetween where the mold elements join together. An edge portion of a pivoted blade member spans the gap when the mold elements come in contact.

6 Claims, 5 Drawing Figures

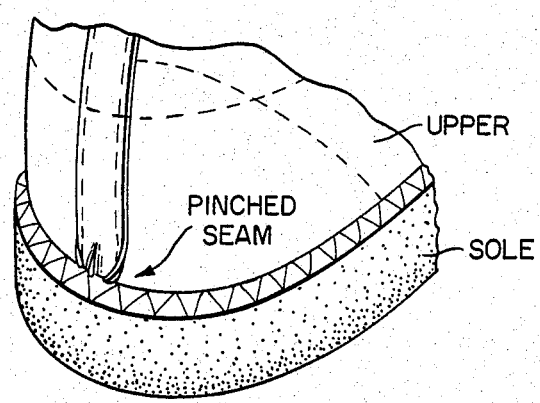
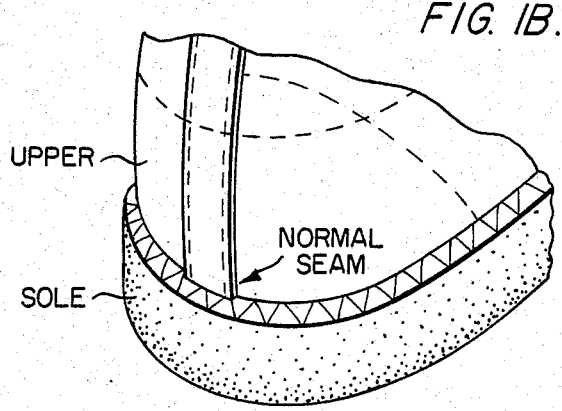
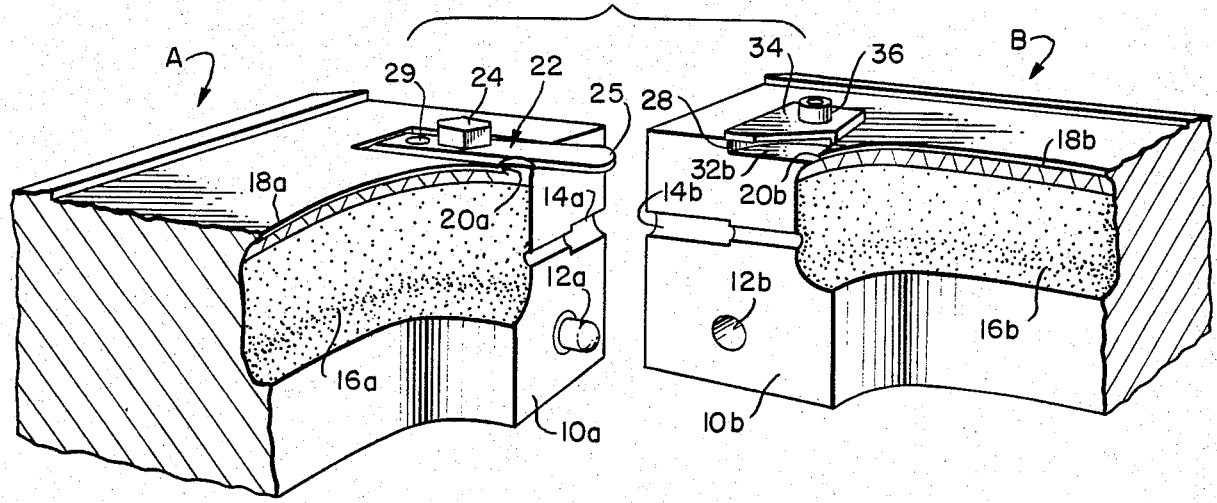
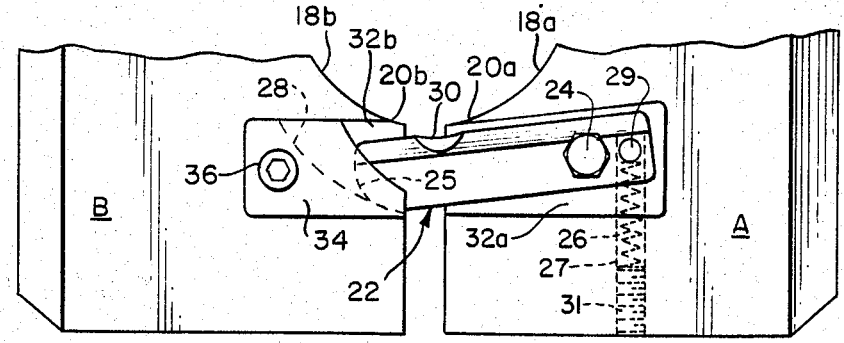
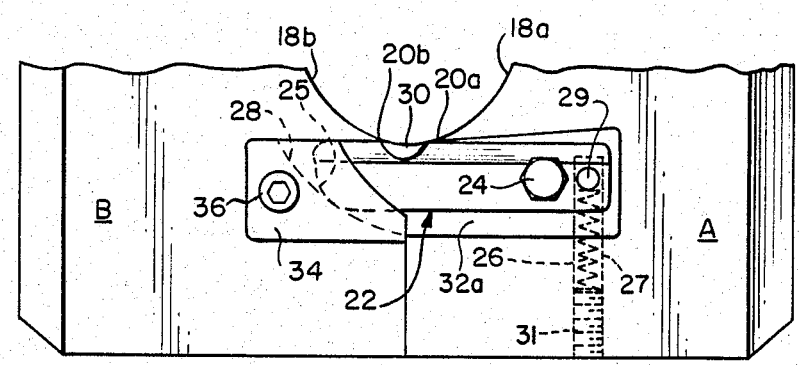

MOLD APPARATUS FOR SHOES AND THE LIKE

BACKGROUND OF THE INVENTION

This invention relates to molded-sole-type shoes and the like and is more particularly concerned with apparatus for molding a sole of rubber or plastic, for example, to a corresponding upper.

The assembly of shoes of the foregoing type (e.g., canvas shoes) typically involves an injection molding procedure wherein a sole is simultaneously formed and attached to an upper. Generally, molds for this purpose comprise a pair of mold elements adapted to come together laterally about the bottom of the upper which is usually held fixed on a last. The mold elements ordinarily include inner walls which define the contours of the sole sidewall and respective peripheral edges along the tops of the inner walls. The peripheral edges of both mold elements together constitute a bite which engages (i.e., seals against) the upper during the molding operation and which defines the top of the sole sidewall.

A problem has heretofore existed with molds of the foregoing type in that when the mold elements are brought together, the upper is often pinched at the heel and/or toe between abutted ends of the peripheral edges which constitute the bite. This, of course, results in a defect in the assembled shoe. It has been proposed, in one known attempt to alleviate this problem, to configure corresponding ends of the peripheral edges so that there is a gap in the bite where the mold elements come in contact. A fixed straight blade is attached to one of the mold elements and moves laterally to fill in the gap and complete the bite as the mold elements are brought together. This technique has proved unsatisfactory, however, because the material of the upper is often cut by the laterally moving blade.

SUMMARY OF THE INVENTION

The present invention overcomes the deficiencies of the preceding technique through the use of a pivoted blade member which moves substantially longitudinally to engage an upper when the mold elements come together. More particularly, according to a broad aspect of the invention, a blade member is pivotally attached to the first of a pair of mold elements adapted to come together laterally, the mold elements having respective peripheral edge portions configured at corresponding ends for defining a gap between those ends when the mold elements come together. The second mold element includes means, such as a cam surface, cooperable with the blade member when the mold elements come together for causing the blade member to move to a position whereby an edge portion thereof spans the aforesaid gap.

The various features and advantages of the invention will be appreciated more fully from the detailed description of the preferred embodiment hereinafter taken in conjunction with the accompanying drawing.

BRIEF DESCRIPTION OF THE DRAWING

FIG. 1A is a fragmentary perspective view showing the heel portion of a shoe with a defect;

FIG. 1B is a similar view without a defect;

FIG. 2 is a fragmentary perspective view of mold apparatus in accordance with the invention;

FIG. 3 is a fragmentary plan view showing mold apparatus in accordance with the invention in a partially closed position; and FIG. 4 is a fragmentary plan view showing mold apparatus in accordance with the invention in a closed position.

DETAILED DESCRIPTION OF THE PREFERRED EMBODIMENT

FIG. 1A illustrates a pinching defect of the type which can occur in the use of prior sole-forming molds. In particular, FIG. 1A shows the heel portion of a shoe which has a pinched seam (so designated) in the upper, adjacent to the rear extremity of the sole sidewall. A normal heel is depicted in FIG. 1B.

FIGS. 2–4 show a preferred form of mold apparatus according to the invention adapted specifically to avoid defects of the type just described. In particular, FIGS. 2–4 depict parts of a ring mold constructed in accordance with the invention. As is well known in the art, a ring mold may comprise a pair of mold elements such as A and B which are cooperable with a sole plate (not shown) that inserts upwardly between them to complete the mold. For the purposes hereof, only the heel portions of mold elements A and B are shown.

Referring now to FIG. 2 in particular, it will be observed that mold elements A and B are adapted to come together laterally at their heel ends along respective contact surfaces 10a and 10b. A guide pin 12a projects from contact surface 10a for engagement with a hole 12b in contact surface 10b to ensure proper alignment of the mold elements. Contact surfaces 10a and 10b may also include respective elongate indentations 14a and 14b which form an injection port through which liquefied rubber, plastic or the like can be introduced into the mold.

Still referring to FIG. 2, mold elements A and B further include respective complementary surfaces 16a and 16b, adapted to define the contours of the sole sidewall, and respective peripheral edge portions 18a and 18b which project inwardly (with respect to the sole-forming cavity) from those surfaces for defining the top of corresponding portions of the sole sidewall. According to the invention, peripheral edge portions 18a and 18b are truncated at corresponding end points 20a and 20b which are spaced slightly from contact surfaces 10a and 10b as shown. Thus, it will be apparent that when mold elements A and B are brought together, there will be a gap between the end points 20a and 20b (see FIG. 4). It will be appreciated that when mold elements A and B are closed about an upper in the usual manner, peripheral edge portions 18a and 18b will engage the upper, forming a seal thereagainst. In practice, the peripheral edge portions will usually be continuous between the longitudinal ends of surfaces 16a and 16b (except as modified to provide the previously described gap), together constituting the greater part of a bite which seals the mold to the upper along the top perimeter of the sole-forming cavity.

In accordance with the invention as shown in FIGS. 2–4, a flat blade member 22 is pivotally attached to mold element A, as for example by bolt 24. The blade member is positioned in such a manner that a front edge portion 30 thereof is situated rearward of peripheral edge portions 18a and 18b. Blade member 22 is further oriented so that front edge portion 30 can be moved into contact with end points 20a and 20b (and into engagement with an upper) when mold elements A and B are brought together as will be described shortly. For reasons which will be readily apparent, it is preferred that blade member 22 be biased toward the rear of the mold, outward from the peripheral edge portions, by suitable means such as the cooperable compression spring and pin arrangement illustrated in FIGS. 3 and 4. As shown therein, a compression spring 26 is located within a bore 27 in the body of mold element A. Bore 27 extends inward from the rear end of mold element A and beneath a pin 29 which is affixed to blade member 22 longitudinally outward of bolt 24. The shaft of pin 29 (not shown) extends downward through an arcuate slot (not shown) in communication with bore 27, the shaft terminating within the bore. The ends of compression spring 26 are constrained between the shaft of pin 29 and a compression adjustment screw 31 which threads into the rear of bore 27. The spring thereby applies a force to the shaft of pin 29 for biasing blade member 22 in the desired manner With continued reference to FIGS. 3 and 4, it will be observed that when mold elements A and B are brought together, a free end 25 of blade member 22 extends over a portion of mold element B. Mold element B includes a cam surface 28 adapted to abut free end 25 and more particularly to urge blade member 22 forward (against the bias of spring 26) as the mold elements move toward one another. As is best seen in FIG. 4, cam surface 28 is configured to cause blade member 22 to move to a position whereby edge portion 30 thereof spans the previously described gap between end points 20a and 20b when mold elements A and B come into contact. It is preferred that edge portion 30 be situated substantially in the plane of peripheral edge portions 18a and 18b, as shown, so that it actually fills in the gap between end points 20a and 20b. So arranged, blade edge portion 30 and mold element peripheral edge portions 18a and 18b will form a substantially continuous edge which seals against an upper when the mold elements come together, thereby providing a smooth surface for defining the top extremity of corresponding parts of the sole sidewall.

To achieve an arrangement of the type just described, mold elements A and B are provided with complementary recessed surfaces 32a and 32b, respectively (see FIG. 3). Blade member 22 is mounted on recessed surface 32a, and its free end locates over recessed surface 32b when the mold elements are brought together. A cover plate 34 may be attached to mold element B, as by a bolt 36, above recessed surface 32b, as shown, to provide a space in which free end 25 of the blade member is constrained when the mold elements come together.

It should be noted that in practice, parts of peripheral edge portions 18a and 18b adjacent respective end points 20a and 20b will usually be curved as shown. In such cases, it is preferable that edge portion 30 of blade member 22 also be curved to complement the curved parts of the peripheral edge portions in the manner illustrated.

With the preceding discussion in mind, it will be appreciated that by virtue of the invention, mold elements A and B may be brought together about an upper without danger of pinching or cutting defects of the type herein described. In particular, because peripheral edge portions 18a and 18b are configured to provide a gap between corresponding end points 20a and 20b when the mold elements come together, the upper cannot be pinched between those end points. Furthermore, because blade member 22 moves (i.e., pivots) substantially longitudinally to span the aforesaid gap, there is no significant lateral movement of the blade member while it is in contact with the upper, and the upper therefore cannot be cut by the blade edge portion 30.

While a preferred form of the invention has been shown and described herein, it will be apparent to those skilled in the art that changes may be made within the scope of the invention as defined in the appended claims. For example, it will be apparent that a pivoted blade member may similarly be applied at the toe end of a sole-forming mold and further that such blade members may be simultaneously applied at both the heel and toe ends of a single mold.

The invention claimed is:

1. Apparatus for molding the sole of a shoe and the like to an upper, comprising first and second mold elements adapted to come together laterally and a blade member pivotally attached to said first mold element, the mold elements each including a respective peripheral edge portion adapted to engage said upper and to define the top extremity of a corresponding portion of the sole side wall, the respective peripheral edge portions having corresponding ends configured for defining a gap between those ends when the mold elements come together, said second mold element including means cooperable with said blade member when the mold elements come together for causing said blade member to move to a position whereby an edge portion thereof spans said gap.

2. Apparatus in accordance with claim 1, wherein said means cooperable with said blade member comprises a cam adapted to abut a free end of said blade member.

3. Apparatus in accordance with claim 1, wherein said blade member is spring biased outward from said position.

4. Apparatus in accordance with claim 1, wherein parts of said respective peripheral edge portions adjacent said corresponding ends are curved and wherein said edge portion of the blade member is curved to complement said parts.

5. Apparatus in accordance with claim 1, wherein said first mold element includes a recessed surface on which said blade member is mounted and wherein said second mold element includes an additional recessed surface over which a free end of said blade member locates when the mold elements come together, whereby said edge portion of the blade member fills in said gap.

6. Apparatus in accordance with claim 5, wherein said additional recessed surface is covered by a plate, said plate and said additional recessed surface together defining a space into which said free end inserts when the mold elements come together.

* * * * *